Patented June 8, 1954

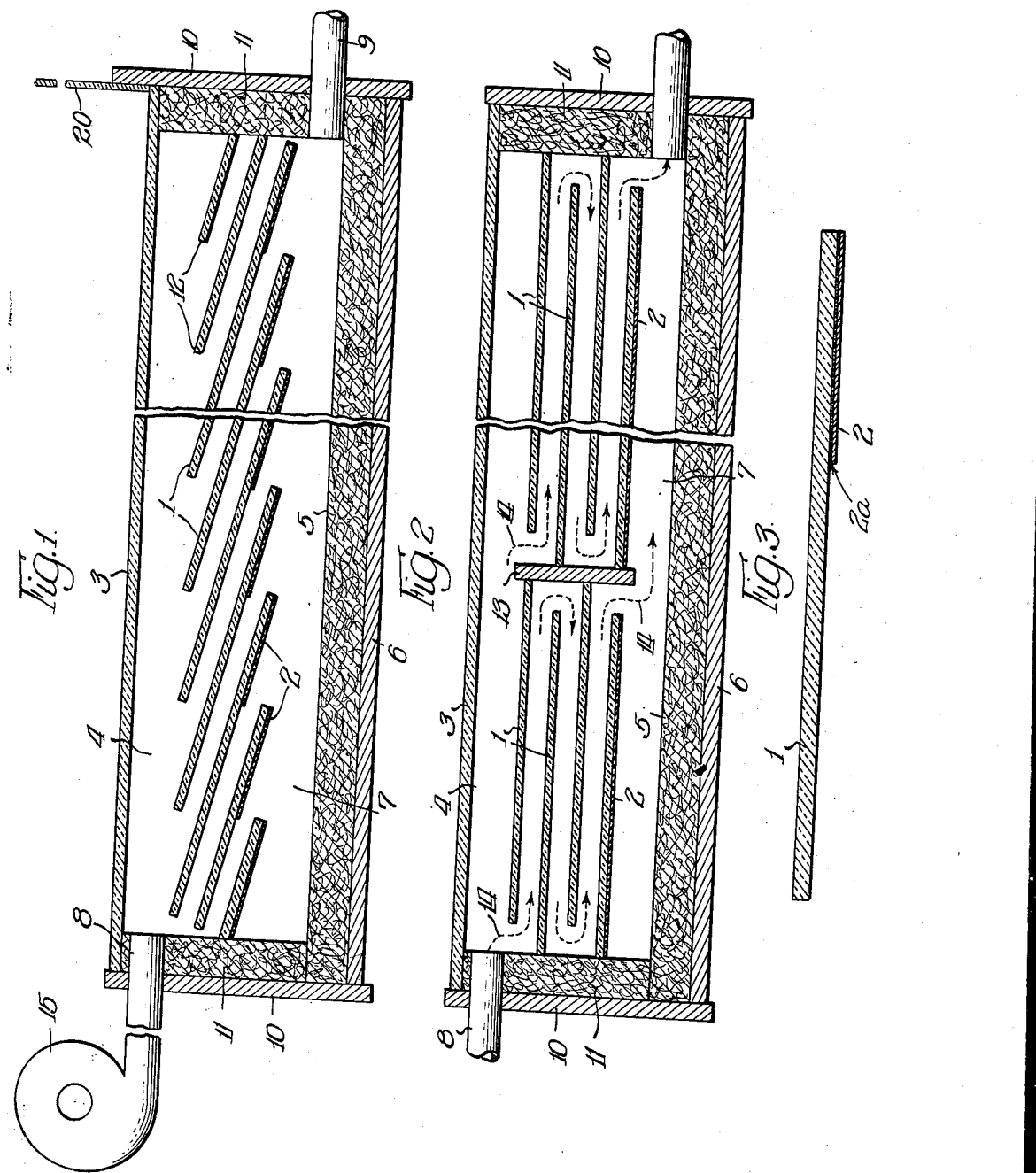

2,680,437

UNITED STATES PATENT OFFICE 2,680,437

SOLAR HEAT TRAP

Kenneth W. Miller, Chicago, Ill., assignor to The Board of Regents of the University of Colorado Application December 3, 1945, Serial No. 632,386

11 Claims. (Cl. 126—270)

This invention relates generally to the collection of radiant solar energy in the form of useful heat.

It is well known that at noon on a cloudless day the energy of sunlight in mid latitudes is of the order of one horsepower per square yard or nearly 300 B. t. u. of heat per square foot per hour. The solar energy which impinges on unit area—vertical, horizontal or inclined at various angles to the horizontal and to the meridian (or to north)—and in different latitudes, seasons and times of the day, is readily calculable. The magnitude of the solar energy procurable even over comparatively small areas and even at low efficiencies of recovery is such as to encourage attempts to use it for practical purposes, particularly in geographical regions where fuel is scarce or expensive and sunlight plentiful, such for example, as in the southwest region of the U. S. A. e. g., Arizona, New Mexico, etc.

An object of this invention is to provide a simple, inexpensive, effective means of collecting or trapping solar energy for general use, but in particular for heating homes or other structures in winter, and, through auxiliary refrigerating or dehumidification means, of air conditioning such buildings in summer.

Several advantages of the preferred form of my invention are as follows:

Air may be heated by sunlight to predetermined temperature, up to two or three hundred degrees Fahrenheit with or without recirculation of air in whole or in part and at comparatively high efficiency of energy conversion. Gases other than air may be heated for industrial purposes. In fact, transparent liquids (e. g. water) may be circulated for heating instead of air. The device may be variously combined with heat storage in a water tank or gravel bed. The solar heat trap may be combined with chemical solution or dehydration cycles for cooling, dehumidification, or air conditioning. Applications to industrial drying or evaporation processes are possible.

Other objects and advantages, as well as a plurality of modifications, will appear more fully in the following detailed description which is supplemented by the accompanying drawings, in which like reference numerals indicate similar parts throughout, and in which:

Figure 1 is a longitudinal section through the preferred embodiment of the novel solar heat trap of my invention;

Figure 2 is a longitudinal section through a modified form of the invention; and.

Figure 3 is a longitudinal section through a single inclined plate of Figure 1.

As shown in Figure 1 and in detail in Figure 3 the essential part of the device is a series of overlapping plates 1, which may be ordinary window glass. The exposed or bottom under area of the inclined plates is covered with aluminum foil 2 cemented to the glass with a jet black adhesive 2a (e. g. lamp black in shellac). Therefore, when viewed from below the entire visible area 2 is a highly reflecting polished metal surface. When viewed from above, the entire area is jet black as seen through the transparent cover glass 3 and through the transparent leading portions of the inclined plates 1.

The top cover glass 3 forms a plenum chamber 4 for the cool incoming air above the inclined plates, while the mineral wool insulation 5 and floor 6 form a similar chamber 7 for the hot exit air. Cool air enters the upper chamber 4 through entrance duct 8 and heated air leaves the lower chamber 7 through exit duct 9. The ends of the device are closed by members 10 which are thermally insulated at 11.

Any number and dimension of inclined plates 1 may be used to achieve desired overall length, and the plates may be given various, but uniform or equal, amounts of overlap depending on the operating conditions desired. The more overlap or layers, then the greater the possible temperature rise. The cover glass and inclined plates may be supported at their back and front side edges by strips (not shown in longitudinal section Figure 1). Additional support may be provided for wide plates or units by spacing strips or blocks inserted between the inclined plates 1 and in the top and bottom plenum chambers 4 and 7, so long as such strips or blocks are narrow and positioned parallel to air flow. Fractional length glass plates 12 may be used to terminate the ends of the inclined plate assembly as shown in Figure 1.

Operation of the device is very simple. Ordinary glass is transparent to the majority of wave lengths of solar radiation in the visible spectrum from near ultra-violet to infra-red, comprising the major portion of the energy in sunlight. Beyond about 20,000 angstroms, however, glass is totally opaque and the major portion of radiant energy at any temperature less than 1000° F. is in the very far infra-red beyond this wave length. Therefore, sunlight which falls on the device passes through the cover glass 3 and inclined plates 1 until it strikes the under black surface 2. Here it is absorbed and changes to heat. Escape of heat upwards must be accomplished by radiation from upper surfaces of plates 1 through air films, reabsorption by undersurfaces of plates just above, and conduction through plate thickness, all this repeated for each air film since plates are opaque to heat radiation. The multiple overlapping plates 1 thus act vertically as a set of heat radiation resistances in series so that in practice a temperature rise of about 50° to 75° F. can be achieved per air film in vertical direction. Considering any one inclined plate, there is a temperature gradient, rather uniform, from initial cool entering air temperature at upper end 4 to full final temperature at the lower end 7.

Air is circulated through the device from entrance duct 8 to exit duct 9 by a fan blower 15. Although Fig. 1 illustrates the alternative of a fan or blower in the entrance duct 8, forcing air flow by positive draft, it is obvious that the air circulation may otherwise be produced by an induced draft fan in the exit duct 9, or, for cases in which gas flow is recirculated in whole or in part, the fan or blower may be placed at any convenient location in the closed gas circuit. Wherever the fan is located, air is forced lengthwise downward through the spaces between inclined plates 1 at a slow rate in streamline or non-turbulent flow. This air picks up the heat from the glass surfaces and delivers it to the lower plenum chamber 7 at full heat recovery temperature. In effect, we have counterflow of air and radiant energy—the most efficient type of heat transfer—and, moreover, the glass acts not only as a radiant heat energy "trap" but also both sides of each plate 1 serve as heat transfer surface. The cover glass 3 also performs in a similar manner but, of course, less efficiently than the inclined plates 1. The cover glass 3 performs the additional functions of protecting the inclined plates from snow, rain, and dirt (it is easily cleaned) and also shields the air films from unequal and varying pressure heads due to outdoor wind.

The heat insulating function of thermal insulation 5 and 11 is obvious. Several heat trap units such as shown by Figure 1 may be operated side by side in parallel. Heat insulation between such adjacent units is unnecessary, although it should be provided around the entire outer perimeter of a multiple set of parallel units, that is, at the two outside sides of outer units of such multiple group, as well as at all ends 10, 11.

When the sun is covered by clouds, or at night, the fan or blower is first slowed (or dampered) and finally stopped. Then the under reflecting aluminum foil surfaces 2 function as reflecting thermal insulation, greatly slowing escape of heat by air in the lower chamber 7.

There are three major losses of heat and efficiency in this device: (a) Multiple surface reflection of sunlight from the inclined plates 1 and cover glass 3. This loss increases with extent of overlap of plates and is about 25% for the arrangement shown in Figure 1. This loss may be reduced to about 10% by non-reflective surface treatment in a cheap and adequate process for this purpose, as, for example, by a leaching process, or by depositing a film of proper index of refraction on the glass, or by other methods known to those skilled in the art. However, plain untreated glass does a first-rate job. (b) Reradiation to the sky and convection of heat to outdoor air from the upper cover plate 3. The temperature of the cover plate is so low (almost initial air temperature) that these losses are not serious (about 25%). (c) Conduction and convection losses from bottom and edges of a multiple unit bank. The edge losses are small since the trap is very shallow and the perimeter area is small compared to the total surface, particularly when many square feet are covered. The loss through the under surface through thermal insulation 5 may be made as small as practical and for winter heating may often be usefully recovered anyway. (For summer air conditioning such losses must be vented from the attic.)

Ordinary absorption of solar radiation within the inclined and cover glasses does not cause any substantial heat loss since almost all of this absorbed energy is collected into the air stream and usefully recovered. This is important since, likewise, within reason, some dust collection on the inclined plates 1 is not fatal to effective operation.

As a practical matter, the inclined position of the plates makes replacement of broken glasses very simple and easy by merely sliding them out or into place and also facilitates cleaning, should it be required at infrequent intervals.

The device uses only the most simple and inexpensive materials: window glass, aluminum foil, black adhesive, thermal insulation, and structural members. It is particularly adaptable to roof units and requires for operation only a small motor-driven blower or fan. Air pressure drop is very small. It does not require any liquid for operation and can be easily built into a gable roof on either a new or existing building. It can operate effectively winter or summer in direct sunlight and has a surprisingly good efficiency in hazy atmosphere or even under a thinly clouded "overcast" sky.

The device is capable of many applications. The dimensions and overlap of plates 1 may be altered for different air flow rates, final temperatures, etc. Air may or may not be recirculated in part or completely in a "closed" air system. In a closed circuit, gases other than air may be heated for industrial processes. In fact, transparent liquids (water) can be circulated for heating instead of air. The device can be combined with heat storage in water or gravel bed in several combinations. The solar heat trap may be combined with solution or dehydration cycles for cooling or air conditioning. Applications to industrial drying or evaporation processes are possible.

Structural detail can be modified in many obvious ways. For example, plates 1 may be rearranged in banks between dividing walls or partitions 13, as shown in Figure 2. This forces the air or gas stream to flow in a zig-zag path as indicated by the dotted arrows 14. Although not quite so efficient from a thermal standpoint such construction has advantages for some particular applications. All numbered parts 1 to 11, inclusive, in Figure 2 correspond in function to those already described for Figure 1.

Although Figure 1 and Figure 2 have been described as though placed in horizontal position, it is evident that the device will function in any position (horizontal, vertical or otherwise) in which the sunlight, or other radiant energy, can enter the cover glass and transparent plates directly or even by reflection from a mirror. Obviously, one advantageous position would be on a hillside or gable roof sloped to be perpendicular to the sun's rays at or shortly after noon at the time of year (or average for year) when largest heat recovery is desired. If the heat trap is mounted in a substantially horizontal position, say on the ground or on a flat roof, the amount of heat collected and fluid temperature rise can be substantially increased by mounting a stationary (or rotating) vertical mirror-surfaced wall along the north side of the heat trap, whereby the heat trap will receive solar radiation both directly from the sun and by reflection from the mirror 20 of said mirror-surfaced wall. For roof units the optimum number of inclined plates over any area is calculated to be 2 or 3 corresponding to ½ or ⅔ overlap, respectively, and optimum spacing between plates is about ¼ inch.

For simplicity and clarity specific materials such as glass, rock wool, aluminum foil, etc. were mentioned in the description. Obviously, the substitution of many other materials is possible and such are contemplated in this disclosure of my invention. In particular, the trailing ends of plates 1 in Figures 1 and 3 above the foil 2, or the entire bottom plate 1 in Figure 2, could be of dark or black glass or coated on the corresponding upper surface with a black film instead of depending entirely or in part upon a jet black adhesive film to cement the metal foil 2, as previously described.

It is to be understood that the materials, construction, and operation of this invention are not limited to the above disclosure except in so far as defined by the scope of the appended claims.

I claim:

1. In apparatus of the character described, the combination with structure forming a chamber having at least one wall transparent to solar radiation, of a series of relatively transparent plates extending across the chamber in overlapping spaced relation with their upper surfaces adapted to transmit solar radiation and arranged to divide the chamber into upper and lower passageways connected by the spaces between said plates and to collectively cover the cross-sectional extent of the chamber, metallic surfaces supported from an under surface of said plates adjacent the lower passageway so as to absorb solar radiation transmitted through the plates and to convert said solar radiation into sensible heat, said metallic surfaces being not more than one-half the length of the transparent plates on which they are supported, and fluid-circulating means arranged to produce a flow of fluid through said chamber from the upper passageway to the lower passageway whereby the fluid moves in contact with said plates and the metallic surfaces so as to progressively heat the fluid in its passage through the chamber.

2. In apparatus of the character described, the combination with structure forming a chamber having at least one wall transparent to solar radiation, of a bank of relatively transparent plates disposed in parallel planes extending across said chamber with at least one end of each plate arranged in lapping relation to an adjoining plate of the bank with their upper surfaces adapted to transmit solar radiation and arranged to divide the chamber into upper and lower passageways and to collectively cover the cross-sectional extent of the chamber, a metallic surface supported at a corresponding end of each of the respective plates and covering a portion of the plate on which it is supported corresponding to the area of the overlap between plates, and fluid-circulating means arranged to produce a flow of fluid from the upper passageway to the lower passageway whereby the fluid moves in contact with said plates and the metallic surfaces so as to progressively heat the fluid in its passage through the chamber.

3. In apparatus of the character described, the combination with structure forming a chamber having at least one wall transparent to solar radiation, of a series of relatively transparent plates extending across the chamber in overlapping spaced relation with their upper surfaces adapted to transmit solar radiation and arranged to divide the chamber into upper and lower passageways connected by the spaces between said plates and to collectively cover the cross-sectional extent of the chamber, heat-absorbing sheets secured to portions of the rear surfaces of said plates adjacent the lower passageway so as to absorb solar radiation transmitted through said plates and to convert said solar radiation into sensible heat, and fluid-circulating means arranged to produce a flow of fluid from the upper passageway to the lower passageway whereby the fluid flows in contact with said plates and the heat-absorbing sheets so as to progressively heat the fluid in its passage through the chamber.

4. In apparatus of the character described, the combination with structure forming a chamber having at least one wall transparent to solar radiation, of a series of relatively transparent plates extending across the chamber in overlapping spaced relation with their upper surfaces adapted to transmit solar radiation and arranged to divide the chamber into upper and lower passageways connected by the spaces between said plates and to collectively cover the cross-sectional extent of the chamber, sheets of metallic foil secured to portions of the under surfaces of said plates adjacent the lower passageway, said sheets of metallic foil presenting substantially black upper surfaces for maximum heat absorption and presenting bright or polished lower surfaces for maximum heat reflection, and fluid-circulating means arranged to produce a flow of fluid through said chamber from the upper passageway to the lower passageway whereby the fluid moves in contact with said plates and the heat-absorbing sheets so as to progressively heat the fluid in its passage through the chamber.

5. In apparatus of the character described, the combination with structure forming a chamber having at least one wall transparent to solar radiation, of a series of relatively transparent plates extending across the chamber in spaced relation with their upper surfaces adapted to transmit solar radiation and arranged to divide the chamber into upper and lower passageways and to collectively cover the cross-sectional extent of the chamber, heat-absorbing media positioned under at least a portion of said plates so as to absorb the solar radiation transmitted through said plates and to convert said solar radiation into sensible heat, means for causing a heat-absorbing fluid to flow between said plates, and a mirror-surfaced wall extending vertically along a side of the chamber in a position to intercept solar rays and deflect them through said transparent wall into the chamber.

6. In apparatus of the character described, the combination with structure forming a chamber having at least one wall transparent to solar radiation, of plural tiers of transparent, vertically spaced plates extending across the chamber with the upper surfaces of the plates adapted to transmit solar radiation and the plates dividing the enclosure into upper and lower passageways, and providing a passage from the upper to the lower passageway, heat-absorbing media positioned underneath at least a portion of the plates of the lower tier so as to absorb the solar radiation transmitted through said plates and to convert said solar radiation into sensible heat, and fluid-circulated means arranged to produce a flow of fluid through said passage whereby the fluid moves in contact with said plates and the heat-absorbing media so as to progressively heat the fluid in its passage through the chamber.

7. In a solar heat trap, the combination of an enclosure having a transparent wall disposed to transmit solar radiation, tiers of substantially parallel, vertically spaced transparent plates in said enclosure, the plates of one tier being supported in spaced relation to one wall of the enclosure and the plates of the intervening tiers being spaced from an opposed wall surface to define a zig-zag fluid passageway between said plates, said transparent plates being disposed in said enclosure with their upper surfaces exposed to solar radiation, defining an upper plenum chamber at the upper end of said tiers, a floor in said enclosure defining a lower plenum chamber beneath the lowermost plate, a heat absorbing metallic sheet disposed beneath the lowermost plate, and means for causing a flow of air to pass from said upper plenum chamber through said zig-zag passageway to said lower plenum chamber so as to cause said air to absorb heat from said transparent plates and from said metallic sheet.

8. In apparatus of the character described, the combination with structure forming a chamber having at least one wall transparent to solar radiation of a series of relatively transparent plates extending across the chamber in spaced relation with their upper surfaces exposed to and adapted to transmit solar radiation entering through said transparent wall, said plates being positioned to collectively cover the cross sectional extent of the chamber and to divide the chamber into upper and lower chambers interconnected by the passageways between said spaced plates, heat absorbing media positioned under at least a portion of said plates for absorbing the solar radiation transmitted through said plates and converting said solar radiation into sensible heat tending to heat the heat exchange surfaces of said plates and heat absorbing media differentially, and fluid circulating means arranged to produce a flow of fluid from the upper chamber to the lower chamber whereby the fluid moves in contact with said plates and heat absorbing media along a pathway wherein the heat exchange surfaces are of increasing temperature in the direction of fluid flow.

9. In apparatus of the character described the combination with structure forming a chamber having at least one wall transparent to solar radiation, of a series of relatively transparent plates extending across the chamber in spaced staggered sequence with their upper surfaces exposed to and adapted to transmit solar radiation entering through said transparent wall, said plates being positioned to collectively cover the cross-sectional extent of the chamber to divide the chamber into upper and lower chambers interconnected by the passageways between said spaced plates, heat absorbing media positioned under at least a portion of said plates for absorbing the solar radiation transmitted through said plates and converting said solar radiation into sensible heat tending to heat the heat exchange surfaces of said plates and heat absorbing media differentially, and fluid circulating means arranged to produce a flow of fluid from the upper chamber to the lower chamber whereby the fluid moves in contact with said plates and heat absorbing media along a pathway wherein the heat exchange surfaces are of increasing temperature in the direction of fluid flow.

10. In apparatus of the character described, the combination with structure forming a chamber having at least one wall transparent to solar radiation, of a series of relatively transparent plates extending across the chamber at an inclination to the horizontal and in spaced relation with their upper surfaces exposed to and adapted to transmit solar radiation entering through said transparent wall, said plates being positioned to collectively cover the cross-sectional extent of the chamber and to divide the chamber into upper and lower chambers interconnected by the passageways between said spaced plates, heat absorbing media positioned under at least a portion of said plates for absorbing the solar radiation transmitted through said plates and converting said solar radiation into sensible heat tending to heat the heat exchange surfaces of said plate and heat absorbing media differentially, and fluid circulating means arranged to produce a flow of fluid from the upper chamber to the lower chamber whereby the fluid moves in contact with said plates and heat absorbing media along a pathway wherein the heat exchange surfaces are of increasing temperature in the direction of fluid flow.

11. A solar heat trap comprising an enclosure divided into first and second compartments by a plurality of closely spaced overlapping plates, a transparent cover for admitting solar radiation into said first compartment for passage through the overlapping plates, radiation absorbing surfaces adjacent said second compartment for collecting solar radiation and changing it to sensible heat, and means for passing fluid to be heated from said first to said second compartment by flow between and in contact with the closely spaced overlapping plates, said plates being constructed of a material which is substantially transparent to solar radiation but substantially opaque to re-radiated sensible heat, said overlapping plates thereby both performing as a multiple film re-radiation type heat insulation for restricting loss of heat energy already collected within or adjacent said second compartment and also simultaneously serving as heat interchange surface between the fluid being heated by progressive contact with the overlapping plate surfaces of higher temperature as said second compartment is approached.

References Cited in the file of this patent

UNITED STATES PATENTS

| Number | Name | Date |
|---|---|---|
| 117,476 | Sperry | July 25, 1871 |
| 172,398 | Deitz | Jan. 18, 1876 |
| 201,439 | Moreau | Mar. 19, 1878 |
| 229,109 | Ely | June 22, 1880 |
| 246,626 | Morse | Sept. 6, 1881 |
| 291,146 | Calver | Jan. 1, 1884 |
| 412,725 | Calver | Oct. 15, 1889 |
| 430,762 | Taylor | June 24, 1890 |
| 659,450 | McHenry | Oct. 9, 1900 |
| 681,095 | Baker | Aug. 20, 1901 |
| 965,391 | Little | July 26, 1910 |
| 984,585 | McHenry | Feb. 21, 1911 |
| 1,056,861 | Walker | Mar. 25, 1913 |
| 1,158,175 | Cherrier | Oct. 26, 1915 |
| 1,814,897 | Coxe | July 14, 1932 |
| 1,880,938 | Emmet | Oct. 4, 1932 |
| 2,207,656 | Cartwright et al. | July 9, 1940 |
| 2,469,496 | Christenson | May 10, 1949 |

FOREIGN PATENTS

| Number | Country | Date |
|---|---|---|
| 325,179 | Great Britain | Feb. 13, 1930 |
| 503,538 | Germany | Mar. 28, 1931 |